July 25, 1939.  A. G. HILLMAN  2,167,454

OPTICAL SYSTEM FOR COLOR PHOTOGRAPHY OR CINEMATOGRAPHY

Filed Jan. 19, 1938  3 Sheets-Sheet 1

INVENTOR
Albert George Hillman
BY
Albert F. Nathan
ATTORNEY

July 25, 1939.     A. G. HILLMAN     2,167,454

OPTICAL SYSTEM FOR COLOR PHOTOGRAPHY OR CINEMATOGRAPHY

Filed Jan. 19, 1938     3 Sheets-Sheet 2

INVENTOR
Albert George Hillman
BY
Albert F. Nathan
ATTORNEY

July 25, 1939.  A. G. HILLMAN  2,167,454
OPTICAL SYSTEM FOR COLOR PHOTOGRAPHY OR CINEMATOGRAPHY
Filed Jan. 19, 1938  3 Sheets-Sheet 3
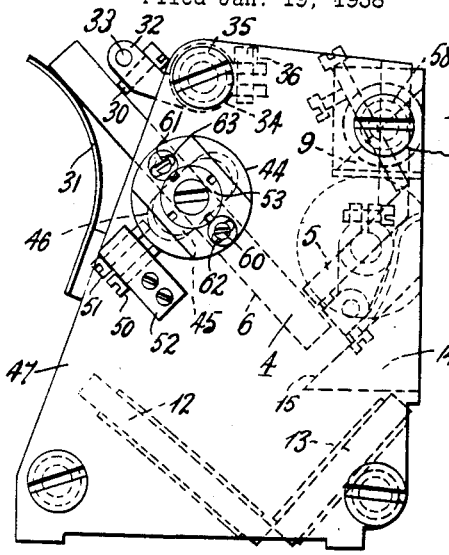
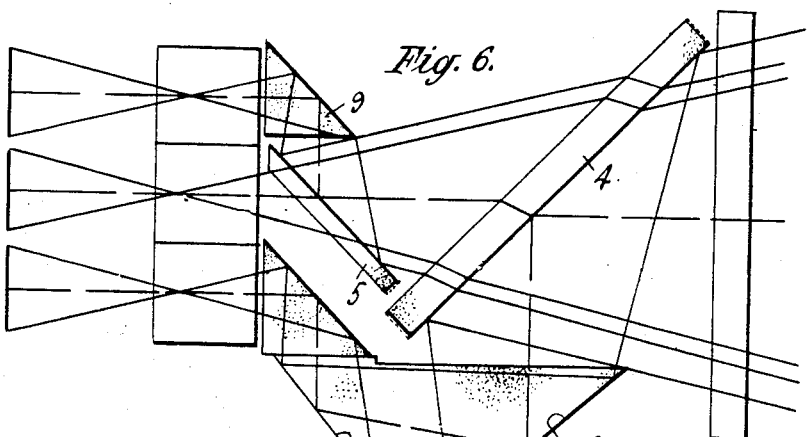
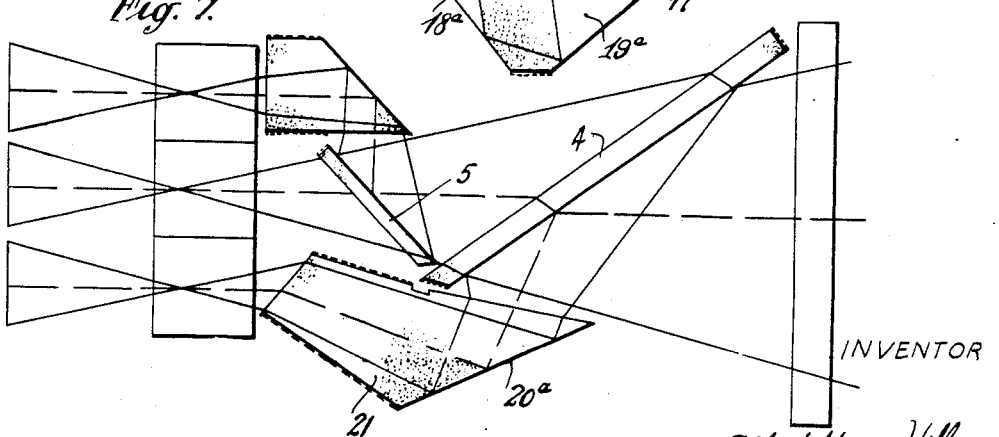
INVENTOR
Albert George Hillman
BY Albert F. Nathan
ATTORNEY Patented July 25, 1939

2,167,454

UNITED STATES PATENT OFFICE 2,167,454

OPTICAL SYSTEM FOR COLOR PHOTOGRAPHY OR CINEMATOGRAPHY

Albert George Hillman, Amersham, England

Application January 19, 1938, Serial No. 185,745
In Great Britain January 22, 1937

6 Claims. (Cl. 88—1)

The present invention relates to optical systems especially for the production of negative bands of color constituent cinematographic images which are suitable for producing corresponding positive constituents which may be projected on the screen and so give pictures in substantially natural colors, the invention being particularly applicable for producing negatives for use in carrying out the three-color method of cinematography.

The invention deals in particular with optical systems of the kind in which a main beam is divided into branch beams which produce constituent images from substantially the same point (aspect) of view.

Each of such images is produced through an appropriate color filter, and for good results it is necessary to split the main beam in such relation to the color filters that each image receives a predetermined proportion of the light, so that substantial uniformity of exposure of the three constituent images is attained. The light is for this purpose not equally divided over the branch beams; but varies with the character of the light in which the images are being taken. For example on the basis of full daylight, the following percentages:—

| | Per cent |
|---|---|
| Red | 24.3 |
| Green | 43.2 |
| Blue | 32.4 | serve well. If the light were to be uniformly divided for the three images, it would be found that the green image would be underexposed in relation to the red in particular and to the blue to a lesser degree, and the blue would also be underexposed in comparison with the red. In order to achieve the desired apportionment to secure uniform exposure the components of the optical system have to be specially designed in relation to the color filters, and the difficulty is encountered that an arrangement of the filters in relation to the light dividing system which is suitable for full daylight, is unsatisfactory when photographing in half-watt light.

Where a part of a film is photographed by full daylight and part by half-watt light, the difficulty cannot be overcome by merely changing or reversing the filters, without interfering with the sequence of the color constituent images along the film.

However, in relation to half-watt lighting the proportion of the total quantity of light entering the system and divided off into branch beams for the images taken through the green and blue filters is found to be not very greatly different from the proportion for full daylight, and that if the aforesaid percentages for the blue and green images are reversed good results will be obtained. There is a preponderance of red actinic rays but if the system is designed so that the middle image of each group of three color constituent images is taken through the red filter, this excess of red light can be allowed for by using a slightly denser red filter when taking in half-watt light, and such changes in the blue and green filters as may be necessary can be readily made.

To the foregoing ends, it is now proposed to use the same light dividing system for both full daylight and for half-watt lighting, and accordingly the present invention consists in so mounting the light dividing system that it can be rotated through 180° so as to bring the outside (e. g., top and bottom) branch beams to a reverse position in relation to the outside (e. g., top and bottom) filters of the, or each, group of three filters so that that part of the system which previously transmitted the light through the one filter (e. g., the blue) now transmits light through the other outside filter, (e. g., the green), and vice versa. The image taken through the red filter is produced by light passing through the centre of the system and the system is arranged so that the quantity of light passing directly through the system is substantially the same in either orientation of the system.

It is preferred to mount the optical light dividing system in such a manner that it is rotatable about appropriate guides or bearings on the camera so that the system can be turned without removing it from the camera. The engagement between the system and its guide or bearing should be so free from lost motion or undesirable relative movement as not to involve undesirable shifting of the images.

It is however permissible to provide co-operating locating means between the light dividing system and the camera of such a character that the system can be disengaged from the locating means on the camera and then turned through 180° and accurately positioned by the co-operating locating means in its new position so that each outside beam is co-incident with the former position of the other.

It is very advantageous to provide appropriate means for adjusting the system for shifting the images formed by the outside component beams to bring the three images into alignment and in the correct spaced relationship on the film, so as to ensure that there is substantial co-incidence in the position of the beams before and after reverse.

It is generally preferred to keep the three objectives stationary relatively to the dividing system.

In order that the invention may be the more readily understood, reference is hereinafter made to the accompanying drawings in which:—

Figs. 4 and 5 are similar views to Figs. 2 and 3 of a modified mounting.

Figs. 6 and 7 show in side elevation of the essential elements of two other forms of light divider.

Figure 1:
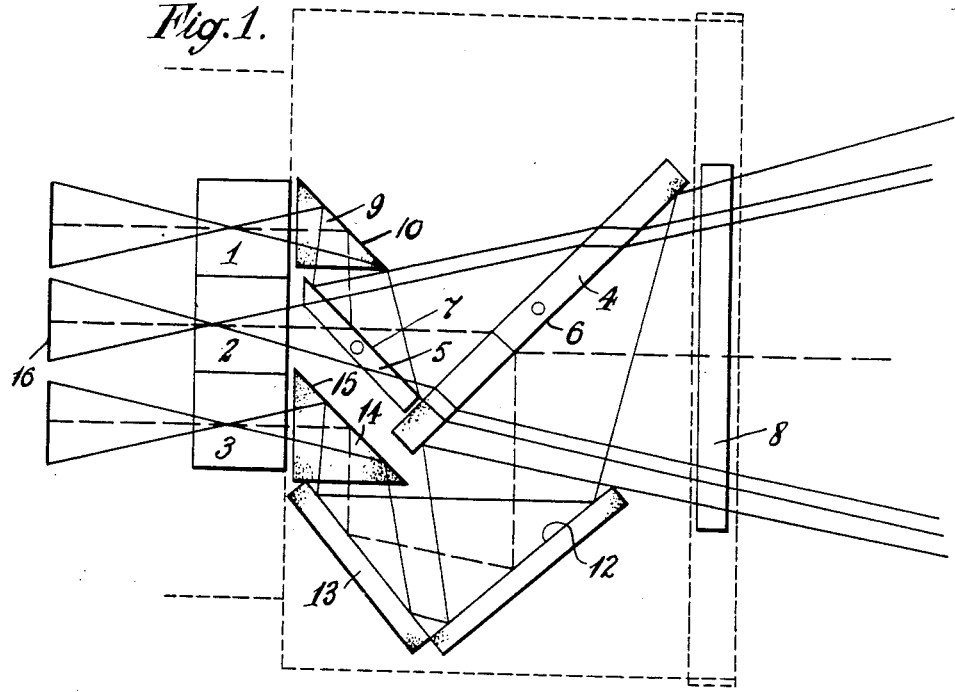
Fig. 1 is a side elevation of the essential components of one form of light dividing system which is suitable for carrying out the present invention.
Figure 2:
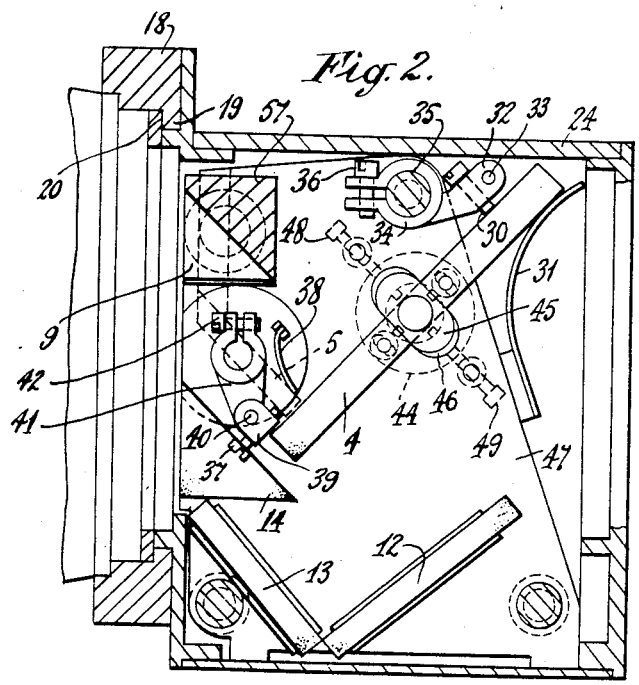
Fig. 2 is a side sectional elevation of the mounting of the divider in accordance with the present invention.
Figure 3:
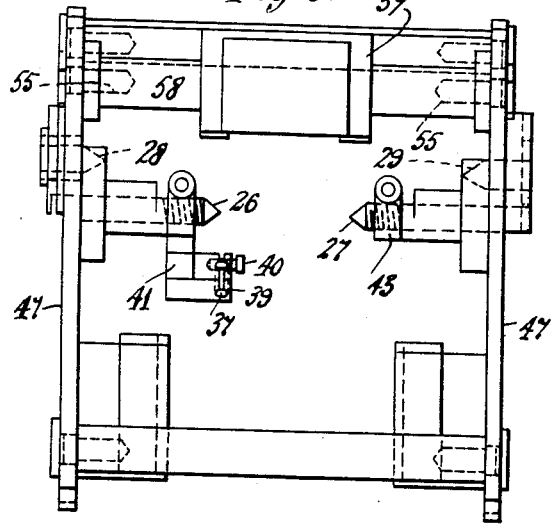
Fig. 3 is an end elevation of such mounting.

The light dividing system shown in Fig. 1 comprises three matched objectives 1, 2 and 3, and in front of the middle objective two glass mirrors 4, 5 having reflecting front surfaces 6, 7 formed by aluminising such surfaces by the cathode sputtering method. Some part of the main beam entering the system through the glass window 8 is reflected by the front mirror 4 and the remaining light passes through such mirror. Part of the light so passing reaches the rear mirror where another division of the light takes place, a part of it passing through the central objective and the other part being reflected onto a prism 9 and thence reflected by the totally reflecting surface 10 through the outside objective 1 (hereinafter called the top objective).

The light reflected from the front mirror is incident upon a reflecting surface 12, which in Fig. 1 is a plane mirror aluminised on its front face, whence the light of this component beam passes to a second reflector 13 of a similar character and thence by way of a right-angled prism 14 having a totally reflecting surface 15 through the bottom objective to the focal plane 16.

The box 24 containing the prisms and reflectors is annularly slide-guided within a ring lens mount 18, by the engagement with a close fit of an annular projection 19 on the ring lens-mount within an annular groove or recess 20 in the divider box. The ring carrying the projection 19 may be a separate ring attached to the ring lens-mount. If desired, the groove could be formed on the ring and the projection on the divider box. The lens mounting and focussing arrangement may be in accordance with my co-pending application No. 24614/1936.

Instead of using glass mirrors, perforated metallic mirrors, e. g., of stainless steel, could be used.

The mirrors or prisms through which the component beam passes to the lower objective may be fitted in a predetermined fixed position in the box 24 by the aid of accurately arranged plane supporting surfaces, e. g., in supporting side channel pieces or in a supporting cradle, the cradle being supported on a horizontal supporting face so that it can be slidden to and fro until, by photographic tests its predetermined position is reached, whereupon it may be screwed or otherwise fixed in such position.

The front and rear reflectors are rotatable about bearing pivots 26, 27, 28, 29 whose pointed ends intrude into appropriately shaped holes in the edges of the mirrors.

These pivots form axes at right angles to the film length so that by rotating the mirrors thereabout, picture pitch, i. e., spacing of the images along the film, can be correctly adjusted. The adjustment of the front mirror 4 is conveniently effected by the fine screw 30 acting against a spring 31. The screw 30 is arranged in a split clamp 32 which can be freed to allow of adjustment being effected but can be tightened, following adjustment, by means of a screw 33. The split clamp 32 may be carried by a bracket 34, which is itself split and embraces a cross rod or strut 35 to which it can be tightly clamped by means of the screw 36. The bracket can therefore be slackened and turned to vary the position at which the screw 30 acts against the mirror.

For adjusting the small mirror, a fine screw 37 acting against a spring 38 can be used, the screw being mounted in a split clamp 39 clamped by a screw 40, the clamp being carried by a split bracket 41 which can be clamped by means of a screw 42 around the bearing pivot 26. The split bracket also serves to control the resistance which the screwed extension of the pivot end offers to rotation. A similar clamp 43 determines the resistance which the screwed portion of the bearing pivot 27 offers to rotation.

Figure 4:
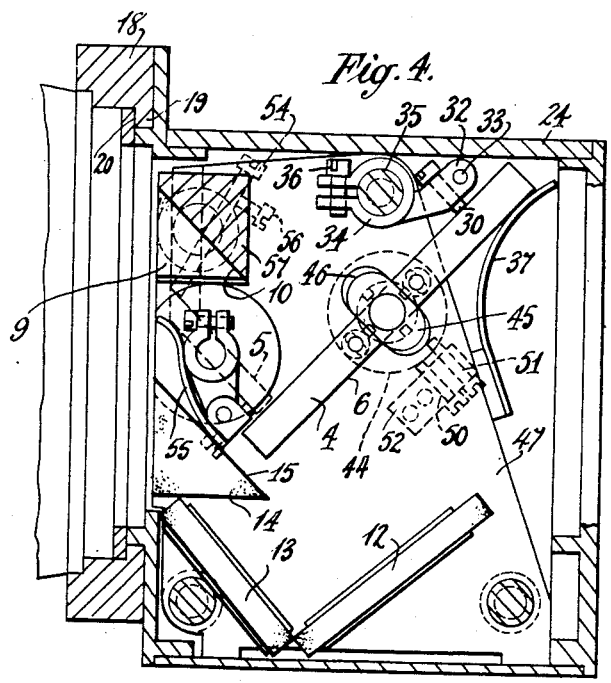

The mirrors are also arranged to be swung about an axis substantially at right angles to the aforesaid axes of rotation in order to permit lateral adjustment of the images on the film. These movements can be readily achieved by arranging for one of the bearing pivots of each mirror to be moved in a direction substantially at right angles to the plane of the mirror. For this purpose such movable pivot is screwed into a disc 44 having a projection 45 to fit with a stiff sliding fit into a slot 46 in the side frame member 47. The disc is operated by opposing screws 48, 49. According to the alternative and preferred form shown in Figs. 4 and 5, the disc 44 is arranged to be slidden by the aid of push and pull screws 50, 51 the push screw 50 engaging a threaded hole in the fixed block 52 and the pull screw passing through a plain hole in such block into a threaded hole in the disc. A lock nut 53 engages the screwed pivot pin and prevents accidental rotation thereof. The disc may be additionally guided by screws 60, 61 fitting into elongated slots 62, 63 in the disc.

The small mirror is adjusted in the variant form by a long fine-pitched screw 54 which passes through the support for the top prism 9 and rotates the mirror 5 against the resistance of a spring 55. The fine-pitched long screw itself offers considerable resistance to accidental rotation to disturb the setting, but it may be retained by a set screw 56.

The prism 9 may be fixed to a carrier 57 carried by a cross rod 58 which is rotatable in holes in the side members 47, the carrier being engageable by a spanner for rotation and being locked by set screws 55. The prism can therefore be rotated about this axis for the purpose of bringing its emergent face parallel to the film track, this single adjustment of the prism being sufficient, as only a slight range of adjustment is ordinarily necessary, the main adjustments being by means of the reflectors.

The light divider casing is made appropriately light-tight by any suitable or well-known means, except for the main and branch beam transmitting apertures.

By the aid of the aforesaid adjustments and with the help of photographic tests a very exact positioning of the images on the film can be attained.

In the light divider shown in Fig. 6, the two mirrors 12 and 13 are replaced by totally reflecting surfaces 17a and 18a of a prism 19a whilst in Fig. 7 a single prism 21 is used having a totally reflecting surface 20a.

The filters are not shown in the drawings, but they are preferably fixed although they may travel with the film, e. g., the image receiving spaces on the film could be suitably coated to form the filters.

When it is desired to change from say daylight to half-watt light or vice versa, the casing 24 is rotated through 180° so as to bring the prism 9 in front of the lower objective 3 and the prism 14 in front of the upper objective 1.

The aluminising of the mirror surfaces has the effect of reducing the quantity of light which the glass will transmit and of reflecting part of the light from the front aluminised surface; the proportion reflected and the proportion transmitted depending upon the quantity of metallic powder deposited on the glass surface. In the case of metallic mirrors the proportions transmitted and reflected will depend upon the size and arrangement of the apertures formed in the mirrors. In either case however the proportions are so selected that the light will be apportioned in such a manner in relation to the different filters that substantial uniformity in the exposure of the images is attained. This apportionment must generally be done by trial and observation.

The system having been accurately adjusted for picture spacing and picture alignment, the rotation of the light dividing system will bring the two outside beams into correct position. It will be generally necessary to use a denser red filter when changing over to half-watt light, and filters of different shades of blue and green may also be used to compensate for the different photographing light and these different filters may readily be used without substantially interfering with the uniformity of density of the different images produced following the change over. With the aid of a suitable system or supply of filters, the same divider may be used for intermediate lights such as arc lighting or mixed lighting.

This change of filters can be readily achieved, for example by the apparatus described in my co-pending application No. 162,456, filed September 4, 1937, without disturbing the sequence of the color constituent images along the film. It is also convenient to arrange for the area of the exposure apertures controlling the different branch beams to be appropriately varied to assist in correctly apportioning the light, and the control of the apertures may be effected simultaneously with the transposition of one filter or set of filters for another as for example in the manner described in my co-pending application No. 239,491, filed November 8, 1938.

Appropriate screw locking means or spring pins or other suitable means may be employed for positively positioning the divider box in either of its two positions. For example two diagonally opposite holes may be provided in the ring mount and two similar holes in the flange of the divider box, removable conical pins being used to pass through one hole in one part and another in the other part in order to hold the box against rotation.

Instead of mounting the light divider in a guide or bearing so that it can be rotated up to a suitable stop without freeing it from the camera, co-operating locating means may be provided between the divider casing the camera which permit of the divider being withdrawn from the camera and turned through 180° and the locating means again brought into engagement. For example, such locating means may take the form of two diagonally arranged pins on one part engaging accurately shaped holes in the other part. The two pins may for example project from the ring lens mount and engage holes in the divider casing, and it is preferred to use tapered pins accurately ground to fit tapered holes in the casing, which holes could be formed by reamering by the same tool exactly to the same depth. Nuts can be engaged with screwed ends of the pins to fix the box against movement.

The forms of divider illustrated are especially suited for use with objectives of short focal length, but the present invention is not restricted to such system; neither is any claim made thereto in the present specification, as they form the subject of my co-pending application No. 185,744 filed January 19, 1938.

The present camera may be used for producing on a single film a series of color selection negatives from which a positive can be produced for projection through appropriate color filters. Or from such a single negative matrice films may be obtained for each of the separate color values by, for example, using a printer in which the basic film is pulled down three pictures at each pull and the film to be printed is pulled down one picture at each pull.

What I claim is:

1. An optical system for producing a continuous series of color constituent negative images along a cinematographic film comprising two outside filters and a medial filter, said filters being of different color and light-transmitting power, means to divide a beam of light into a middle and two outside component beams all of unequal intensity and means for directing said outside beams through said outside filters for the purpose of producing said color constituent images along the film, a carrier for said dividing and directing means and a mount for said carrier, said carrier being rotatable about said mount and relatively to said filters through 180° so as to reverse the positions of said means for directing the outside component beams in relation to the position of the outside filters, and means for determining the rotation in either direction to such angle.

2. An optical system for producing a continuous series of color constituent negative images along a cinematographic film comprising two outside filters and two outside objectives and a medial filter and a medial objective, said filters being of different color and light-transmitting power, means to devide a beam of light into a middle and two outside component beams all of unequal intensity and means for directing said outside beams through said outside filters and objectives for the purpose of producing said color constituent images along the film, a carrier part for said dividing and directing means and a mount part for said carrier part, one of said parts having an annular groove and the other a projection fitting snugly therein so that said mount part is axially locked in relation to said carrier but is rotatable thereabout and relatively to said filters and said objectives, and means for determining said rotation to 180° so that when the mount is turned through that angle the positions of the means for directing the outside component beams in relation to the position of the outside filters are reversed.

3. An optical system for producing a continuous series of color constituent negative images along a cinematographic film, comprising two outside filters and two outside objectives and a medial filter and a medial objective, said filters being of different color and light-transmitting power, means to divide a beam of light into a middle and two outside component beams all of unequal intensity and means for directing said outside beams through said outside filters whilst said middle beam passes through the middle filter for the purpose of producing said color constituent images along the film, a carrier part for said dividing and directing means and a mount part for said carrier part, said parts having co-operating pins and sockets arranged so that the carrier part can be disengaged from the mount part and after being turned thereabout and relatively to said filters and said objectives through 180° re-engaged by means of said co-operating pins and sockets so as to reverse the positions of the means for directing said outside component beams in relation to the position of the outside filters.

4. An optical system for producing a continuous series of color constituent negative images along a cinematographic film, comprising two outside objectives and a medial objective, means to divide a beam of light into a middle and two outside component beams all of unequal intensity and means for directing said outside beams through said outside objectives for the purpose of producing said color constituent images along the film, a carrier for said dividing and directing means and a mount for said carrier, said carrier being rotatable about said mount and relatively to said objectives through 180° so as to reverse the positions of said means for directing the outside component beams in relation to the position of the outside objectives and means for determining the rotation in either direction to this angular displacement.

5. An optical system for producing a continuous series of color constituent negative images along a cinematographic film comprising two outside filters and two outside objectives and a medial filter and a medial objective, said filters being of different color and light-transmitting power, means to divide a beam of light into a middle and two outside component beams all of unequal intensity, said means consisting of two partially transmitting and partially reflecting elements situated in front of said middle objective and permitting the passage of light therethrough to form an image through said middle objective, and means for directing said outside beams through said outside filters and said outside objectives for the purpose of producing said color constituent images along the film, means for adjusting said reflectors relatively to said objectives for shifting the images longitudinally and laterally of the film, a carrier for said reflectors and said directing means and a mount for said carrier, said carrier being rotatable about said mount and relatively to said filters and said objectives through 180° so as to reverse the positions of said directing means in relation to the position of the outside filters and objectives so that the system can be used efficiently for photographing in such different lights as daylight and half-watt light, and means for determining the rotation in either direction to this angular displacement.

6. An optical system for producing a continuous series of color constituent negative images along a cinematographic film comprising two outside filters and two outside objectives and a medial filter and a medial objective aligned with said outside objectives, said filters being of different color and light-transmitting power, means to divide a beam of light into a middle and two outside component beams all of unequal intensity, said means consisting of two partially transmitting and partially reflecting elements situated in front of said middle objective and permitting the passage of image-carrying light therethrough, and means for directing said outside beams through said outside filters and said outside objectives for the purpose of producing said color constituent images along the film, said reflecting elements being rotatably mounted about parallel axes at right angles to the axes of said objectives and to the line joining their centres, means for rotating said mirrors about these axes for the purpose of adjusting the spacing of the images along the film, an end pivot for each of said reflecting elements, means for rotating said elements about said end pivots for laterally adjusting the images on the film, a carrier for said reflecting elements and said directing means and a mount for said carrier, said carrier being rotatable about said mount and relatively to said filters and said objectives through 180° so as to reverse the positions of said directing means in relation to the position of the outside filters and objectives so that the system can be used efficiently for photographing in such different lights as daylight and half-watt light, and means for determining the rotation in either direction to this angular displacement.

ALBERT GEORGE HILLMAN.